Patented Jan. 21, 1941

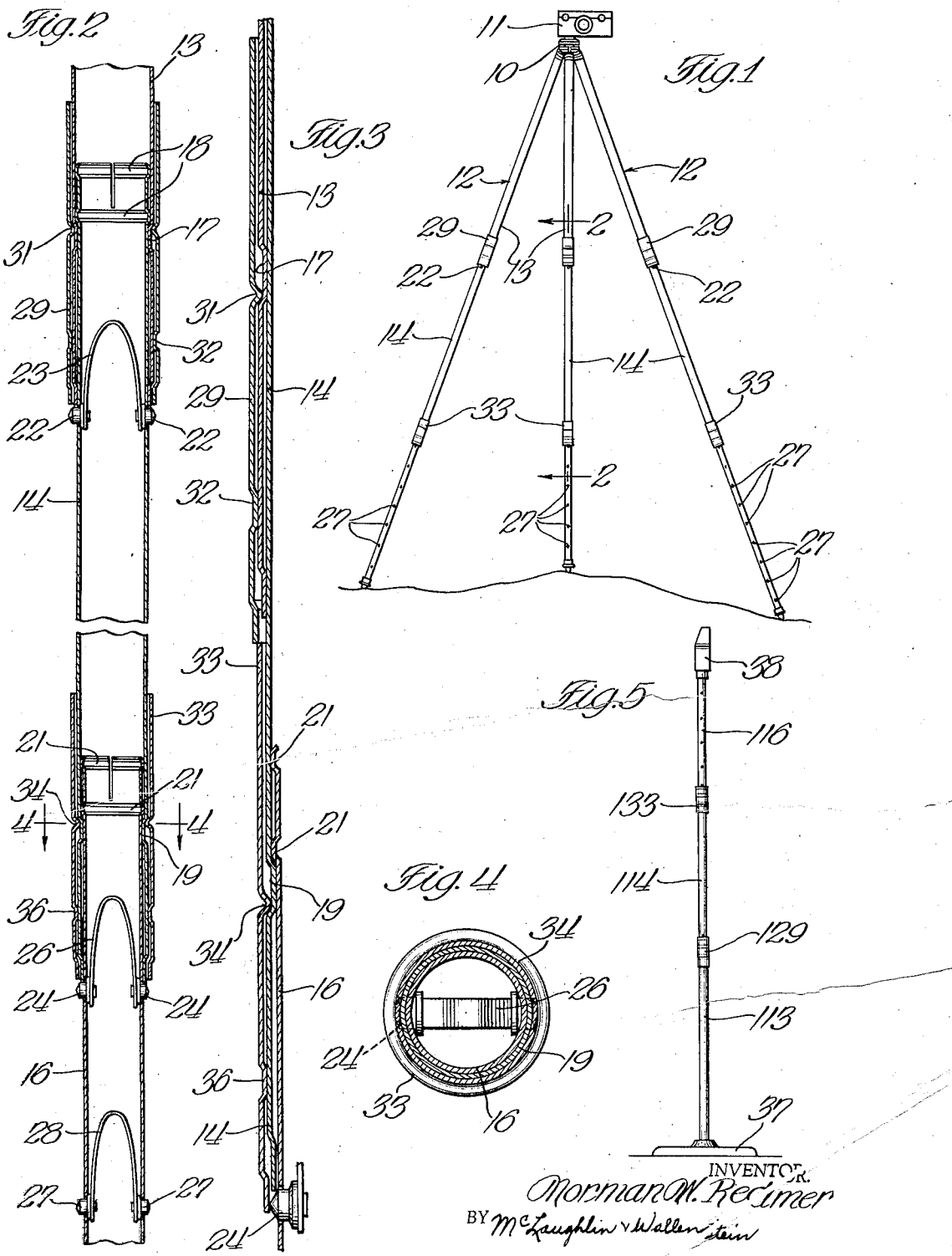

2,229,475

UNITED STATES PATENT OFFICE 2,229,475

TELESCOPING MEMBER

Norman W. Redmer, Chicago, Ill.

Application July 27, 1939, Serial No. 286,851

5 Claims. (Cl. 248—191)

My invention relates in general to telescoping members and more in particular to a camera tripod provided with legs comprising novel telescoping assemblies.

There are a number of instances where telescoping members are employed, the desire or function being to provide for adjustable length of a member during use thereof, and at times as well to telescope the member so that it will occupy a small space for storage or carrying purposes. In one form of telescoping member, such as one type of conventional tripod, the several telescoping sections may be extended the maximum degree, at which point snap catches hold the members in the extended position. Such members, however, are not adjustable to various lengths except by eliminating entirely from extension one of the sections comprising the composite member. In instances where telescoping members are to be adjusted to various lengths, the common practice is to employ a manually operable fastener of some type or other functioning as a friction or braking member to hold the parts to the position to which they are adjusted. Adjustable microphone stands, as generally designed, are fairly illustrative of this type of telescoping member.

The purpose of my invention is the provision of a telescoping member adapted for use as the leg of a tripod, for example, which may be readily extended to a relatively large number of positions and automatically retain any position to which it is extended through the function of an automatic latching or fastening device. This feature entails the use of a plurality, possibly at times a very large number, of automatic fastening or latching devices which would normally have to be released by hand when the members are telescoped within each other. To meet this possible disadvantage, I utilize a novel releasing mechanism so arranged that the telescoping member is as readily brought to its shortest length as extended.

Detailed objects and features of the invention will be apparent from a consideration of the following description taken with the accompanying drawing, wherein Fig. 1 is an elevational view showing a camera tripod embodying my invention;

Fig. 2 is an enlarged fragmentary sectional view taken on the line 2—2 of Fig. 1;

Fig. 3 is a fragmentary sectional view, on a larger scale still than Fig. 2, illustrating one position which the parts may take during the use of the device of my invention;

Fig. 4 is an enlarged sectional view taken on the line 4—4 of Fig. 2, looking in the direction of the arrows; and Fig. 5 illustrates one manner in which my present invention may be applied to a microphone stand.

Referring now to the drawing, I show a tripod comprising a head member 10 carrying a camera 11, the head member 10 having pivoted thereto three adjustable leg members 12, each of which may be constructed in accordance with the features of my present invention. The manner of constructing the head member 10 and pivoting the legs thereto may be modified in various ways, but I prefer to utilize the general structure shown in my prior copending application, Serial No. 276,515, filed May 31, 1939.

Each leg comprises a plurality of mutually telescoping tube members, the number depending upon the design. The tubes are of graduated sizes, one fitting within the other and comprising a series of tubes from the one of largest diameter to the one of smallest diameter. As shown in Fig. 1, the tube of smallest diameter is at the lowermost end of the legs, a conventional arrangement in camera tripods, although it will be understood that the legs might be reversed so far as their functioning is concerned.

In the embodiment shown in the drawing, I employ three tubular members 13, 14 and 16, the details of which are brought out more clearly in Figs. 2 to 4, inclusive, than in the assembly of Fig. 1. Each mutually engaging pair of tubes is provided with stop means to prevent their entire separation. As shown for example, tube 13 has an annular depression 17 which is engaged by the lowermost one of a pair of annular projections 18 at the upper end of tube 14. The provision of two annular projections 18 makes for rigidity when the tubes are fully extended. At its lower end, tube 14 has a similar annular depression 19, and the lowermost tube 16 is provided with annular extensions 21. Thus, stop means are provided for preventing entire removal of one tube from another, these stop means being readily formed from the body of the tubes themselves in what is more or less conventional practice.

Near the top of tube 14 is a second stop mechanism for preventing retelescoping between tubes 13 and 14 when these tubes have been entirely extended. This stop mechanism comprises a pair of plungers 22 extending through openings in the side wall of tube 14 and spring-pressed to their outer position by a U-shaped spring 23 to which the plungers are attached. The plungers emerge at a point immediately below the lower edge of tube 13 and, in this position, function as stops when the tubes are entirely extended.

Similarly, near the top of tube 16 I provide plungers 24 attached to a U-shaped spring 26, the plungers engaging at the lower edge of the tube 14. At a plurality of positions and preferably at substantially regular intervals below the stop comprising the spring pressed plungers 24, I provide a plurality of additional stop means which may be identical with the stop means previously described. One such stop mechanism is shown at the lower part of Fig. 2, and comprises plungers 27 secured to a U-spring 28. To conserve space, only a single one of these additional stop mechanisms is shown in the enlarged Fig. 2, but it will be seen by an examination of Fig. 1 that a relatively large number of plungers 27 is provided along the entire length of the lowermost tube 16. By this construction, tube 16 may be withdrawn to any one of a relatively large number of stop positions and will be retained in the position to which it is withdrawn through the plungers 27 engaging the lowermost edge of tube 14.

To facilitate telescoping of the individual members of the large or composite members, I provide an improved releasing mechanism simply constructed in the form of a sleeve or sleeves disposed on the outside of the tubular members.

Looking first at the uppermost portion of Fig. 2, I provide an outer latch or stop releasing sleeve 29. This sleeve is made relatively free on the tube 13 and has an inwardly projecting annular bead 31 extending into the recess at 17 to permit adequate sliding action but to prevent its entire removal. An annular depression 32 at another point on the sleeve 29 acts as a bearing or steadying surface so that the stop releasing sleeve will not wobble on the sleeve 13. It will be noted that the outer ends of plungers 22 are generally cone-shaped, that is to say, they are shaped so that they will function generally as cams when the lower edge of sleeve 29 engages them. When the sleeve 29 is pushed downwardly from the position it occupies in Fig. 2, therefore, it will depress both plungers 22 to a point where sleeve 13 can ride over them and tube 14 can be telescoped within tube 13.

Near the bottom of the tube 14, I provide a stop releasing sleeve 33 with an annular inward projection 34 engaging in the depression at 19 and a lower internal annular depression 36 bearing against the straight portion of tube 14. In the same manner as described in connection with the sleeve 29, sleeve 33 is slidable to depress the plungers 24. The sleeve 33, however, will also function to depress each of the plungers 27 as they are engaged by the lowermost edge of the stop releasing sleeve.

As the enlarged Fig. 3 shows, sleeve 29 is formed so that its lower edge will engage the upper edge of sleeve 33. This is not a requirement to operation, but facilitates greatly the use of the telescoping member of my present invention. By this means, it is simply necessary to grasp sleeve 29 with one hand and tube 16 with the other hand. By bringing the hands together, tube 14 is telescoped within tube 13, tube 16 remaining stationary with respect to tube 14 until sleeve 29 engages sleeve 33. This brings sleeve 33 to a lower position, as shown in Fig. 3, so that it engages over the outer edge of plungers 24, and the tube 16 then starts to slide with respect to tube 14. As each of the stops 27 is encountered by the sleeve 33, these stops are depressed and the tube 16 is finally telescoped within tube 14 with a single movement of the hands.

For convenience, tubes 13, 14 and 16 have been shown entirely extended with respect to each other. It is to be understood, however, that in actual practice it may be desirable to extend tube 16 only a part of its maximum distance either for the purpose of making adjustments for irregularity in the ground, as shown in Fig. 1, when the telescoping member is to be used for a tripod leg, or for adjusting the height of either an entire tripod or a telescoping member used alone as in a support for a microphone.

I deem it unnecessary to describe Fig. 5 in detail, it being sufficient to point out that a suitable base 37 is provided and the stand may carry a microphone 38. The stand itself may be identical with that shown in detail in Fig. 2, except that the smaller tube is at the top and the larger tube at the bottom. For identification, I employ the same reference characters as used in the preceding figures except prefixed with the numeral "1."

The construction of the support member of my invention should in general be clear to those skilled in the art. By first shaping the tubes and then sliding them together in the same direction as that in which they are normally slidable during the act of extending them during use, the tubes are brought together in slidable relation. The sleeves 29 and 33 may be formed directly in the position in which they will occupy by suitable tooling operations. The stop mechanisms of the type including the spring pressed plungers are formed by first assembling the plungers with the spring and then inserting the entire assembly within the respective tubes, allowing the plungers to expand through openings provided beforehand at proper places in the tubes. In the case of the tube 16, which has a number of stop mechanisms, assembly is readily accomplished by catching the spring 28 with a suitable jig which is introducible through substantially the entire length of the tube. When the stop members reach the right position, the jig is loosened and the plungers are allowed to expand into position.

My invention makes possible the use of a camera tripod in ways which have been deemed ineffective with previous constructions. As an illustration, there are types of cameras, such as the so-called "Graflex," with which a relatively short tripod is desired so that the photographer can look down into the camera from above. Then in other cases, for example, with certain types of movie cameras, the photographer desires to have the camera even with his eye and therefore needs a relatively high tripod. Furthermore, with different people and under different circumstances, the over-all height of the tripod may require adjustment. In old types of wooden tripods with manually operated screw stops, adjustments could be made for different heights, but in the more common tripod, with legs consisting of a series of telescoping tubes, it has been impossible to provide for adequate adjustment as to height. I may, therefore, extend the lowermost tube 16 of each leg the same distance, but let that distance be only a part of the distance to which it is possible to extend it. On the contrary, I may extend the tubular members the entire distance to get maximum height in the tripod or, as previously noted, in the case of uneven ground, I may adjust the legs to different lengths to accomodate them to the ground.

When the telescoping member is to be entirely telescoped, that is, arranged so that all of the tubular members are housed within the tube of maximum diameter, the sleeve 29 is gripped with one hand, as previously noted, and the lowermost end of tube 16 with the other hand. In one movement the entire leg member is telescoped. If, on the other hand, it is desirable merely to adjust the degree of extension of the tube 16, the sleeve 33 may be engaged with one hand and the tube 16 moved in or out, the distance desired.

The advantages of my invention may be considered in connection with the embodiment of Fig. 5 as well. If the stand is to be collapsed entirely, for example, for storage, the sleeve 129 is grasped and the entire stand pushed downwardly. Should performers appear before the microphone of different heights, however, each, as he reaches the microphone, may grasp the tube 116 in one hand and the sleeve 133 in the other hand and simply move the tube 116 until the microphone is in the most suitable position for his height. There is no necessity of releasing any manual stop, or tightening it again, and none of the inconvenience or embarrassment which sometimes occurs when the stop has not been adequately fastened and the microphone stand is allowed to collapse.

I have described my invention in considerable detail in order that those skilled in the art may understand the manner of practicing the same. The details and arrangement of parts, however, may be modified. As one illustration, I show the tube of smallest diameter at the lower end of the tripod leg. The legs may be re-reversed, however, with some advantage. By placing the plurality of stops in the top tube section, they are made more available for adjustment, and sand, grit, or the like, which might otherwise be introduced when using the tripod on a sand beach, for example, are more effectively excluded. While my invention is limited by the scope of the appended claims, therefore, it is to be understood that the claims are to be construed, where they use relative terms, such as top and bottom, in the light of the entire disclosure.

What I claim as new and desire to protect by Letters Patent of the United States is:

1. In a telescoping member, a plurality of mutually telescoping tubes extensible to substantially the total length thereof and telescoping to substantially the length of the outermost tube, stop means between each contiguous pair of such tubes for preventing entire removal of one from the other, stop means between each pair of tubes for preventing telescoping thereof when extended to engage said first-mentioned stop means, said second-mentioned stop means including a depressible plunger, and a sleeve associated with an outer tube at each one of said second stop means slidable to depress one of said plungers, said sleeves being engageable in end to end relationship whereby engagement of a single sleeve in telescoping the member is adequate to release successively all of said plungers.

2. A telescoping member as defined in claim 1, wherein the tube of smallest diameter is provided with a plurality of said second-mentioned stop means, whereby it may be extended, in non-collapsible relation to its associated tube, to a plurality of positions.

3. In a tripod, a head member adapted to support a camera or the like, and leg members pivoted thereto, each leg member comprising a plurality of tubes of graduated diameters, the tube of largest diameter having a tube of smaller diameter slidable therein, and tubes of smaller diameter slidable in tubes of larger diameter of the series, whereby all tubes are mutually telescoping within each other and within the tube of largest diameter, means between each associated pair of tubes for preventing entire removal by sliding of the smaller from the larger, spring-pressed plunger means carried by each of the tubes except the one of largest diameter in a position to engage a lower end edge of its associated larger tube to prevent telescoping with respect to its associated larger tube when fully extended, a plurality of spring-pressed plunger means disposed in spaced relation between the ends of the tube of smallest diameter, whereby said tube of smallest diameter may be extended less than its maximum extensible length and still be prevented from telescoping within its associated tube of larger diameter, and a sleeve slidable on the outside of the tube within which said smaller tube telescopes, and extensible past the end of the tube on which it slides, whereby individually but successively to engage said plurality of spring-pressed plungers to permit telescoping of the tubes to any given point in a single sliding movement.

4. In a tripod, a head member adapted to support a camera or the like and leg members pivoted thereto, each leg member comprising a pair of telescoping tubes, one of relatively larger diameter and one of relatively smaller diameter, said tube of relatively smaller diameter having a plurality of spring-pressed stop means extending beyond that surface thereof which engages within the tube of relatively larger diameter, said stop means being spring-pressed outwardly and distributed at intervals along the length of said tube, and sleeve means extending around a lower portion of the larger tube and movable with respect to the plungers to depress the same and permit telescoping of the tubes by depressing said stop means, said sleeve means being ineffective to depress the stop means in response to mere application of endwise pressure to the tubes, whereby the tripod of which the leg members form a part may be adjusted to various heights and to an irregular supporting surface, and sustain a maximum load without collapsing, and whereby the plurality of stops on the tube of smaller diameter are readily released by said sleeve means when the telescoping tubes comprising the leg members are manually forced into telescoping relation.

5. A telescoping member of the character described, comprising a first tube, a second tube of smaller diameter slidable within said first tube, a plurality of spring-pressed stop plungers carried by the second tube and extending through holes therein, said stop plungers engageable against a lower edge of the first tube when the second tube is withdrawn varying distances from the first tube, the parts being so constructed and arranged that endwise pressure of the tubes in a direction to telescope them is ineffective to release said plungers, and sleeve means carried by the first tube, and of greater diameter than said first tube, said sleeve means being normally out of contact with said plungers but capable of engaging and depressing the same when said sleeve means and plungers are moved relatively to each other.

NORMAN W. REDMER.